Oct. 14, 1930.   S. F. DAVENPORT   1,778,065
ARTIFICIAL BAIT
Filed Nov. 14, 1927
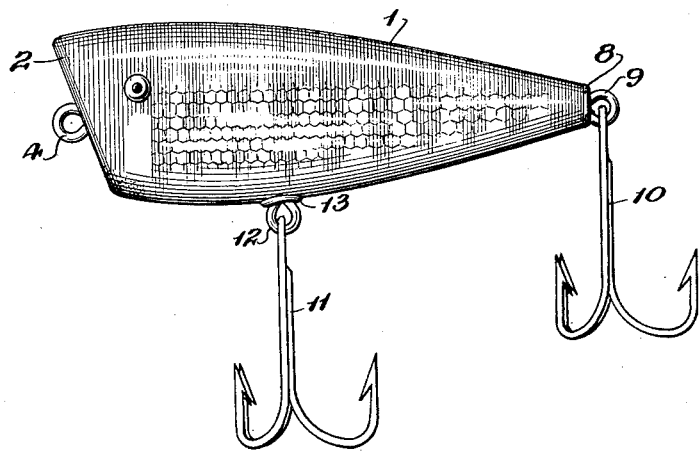
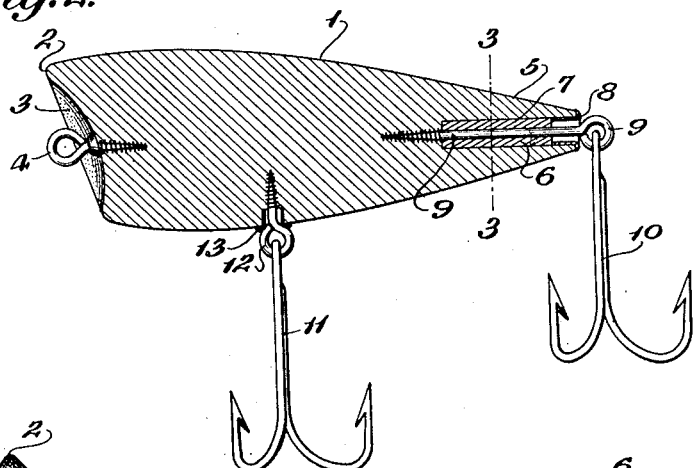
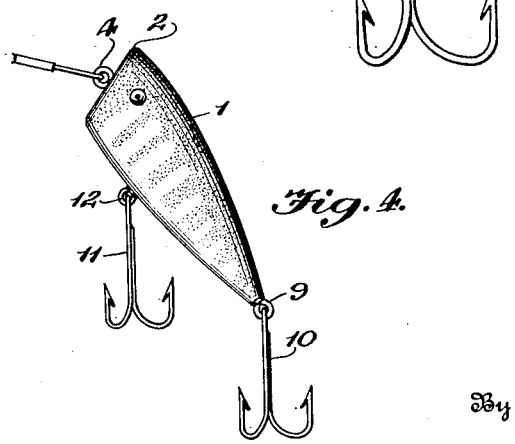
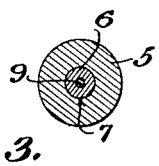
Inventor
S. F. Davenport.
By Eccleston & Eccleston,
Attorneys Patented Oct. 14, 1930

1,778,065

UNITED STATES PATENT OFFICE

SAM F. DAVENPORT, OF AUBURN, INDIANA, ASSIGNOR TO THE CREEK CHUB BAIT CO., OF GARRETT, INDIANA, A CORPORATION

ARTIFICIAL BAIT

Application filed November 14, 1927. Serial No. 233,238.

This invention relates to artificial baits or lures and has for its object to provide such a device which will create a disturbance on the surface of the water in semblance of some living body by means of a series of twitches on the rod and line to which the lure is attached rather than by reeling or direct retrieving of the lure.

A further object of the invention consists in the construction of a lure having a peculiar shape at the forward end thereof such that it will trap air and then emit a series of bubbles and will also offer resistance to the passage of the lure through water, thereby creating a disturbance.

Another object of the invention resides in the design of a lure which will cause a plopping or plunking noise as the head of the lure strikes the water when the lure is in operation.

A still further object of the invention consists in the use of a weight in the rear end of a lure so that it will normally float in a substantially vertical position and assume a position parallel to the water only when a tractive force is applied thereto.

Other objects and advantages of the invention will be apparent from the following description when taken in connection with the accompanying drawing, in which Figure 1 is a side elevation of the complete lure.

Figure 2 is a vertical longitudinal section taken through the lure of Figure 1.

Figure 3 is a transverse sectional view through the lure taken on line 3—3 of Figure 2; and Figure 4 is a side elevational view showing the lure in substantially the position it would assume when at rest in the water.

As already stated, one of the objects of the invention is to provide a lure which will create a disturbance on the surface by the emission of air bubbles and which will also give a plunking or plopping sound, and to this end the head of the body portion 1 of the lure is beveled off to present the upwardly and forwardly extending portion 2 which is provided with the concaved portion 3. The line-securing eye 4 is anchored at about the center of the depression 3 and its vertical position should be at or above the median line of the lure.

It will be apparent that when the lure is caused to assume a horizontal position in the water by a pull on the line, a certain amount of air will be trapped in the pocket 3 due in part to the overhanging portion 2, thereby giving off the sound referred to. The trapped air will, of course, rise to the surface of the water in the form of bubbles, thus creating a disturbance to the surface of the water in addition to the disturbance caused by the movement of the body portion of the lure.

It is the purpose of the invention to provide a lure in which this emission of air bubbles, etc., may be repeated by a series of twitches on the line so as to give the appearance of some living body in the water. For this purpose, it is found desirable to weight the tapered end 5 of the body portion of the lure so that the latter will normally assume a substantially upright position as indicated in Figure 4, the weight also serving to bring the lure back to its upright position after each momentary pull on the line.

The weight, which in the present embodiment of the invention is of cylindrical form, is indicated by the numeral 6, and is positioned within a cylindrical recess 7 in the tapered or tail portion 5 of the lure. A metal ferrule 8 is then inserted in the outer end of the recess in engagement with the outer end of the weight 6 and the parts may be locked in position by means of the screw 9 which serves as an anchor for one of the gang hooks 10. Another gang hook 11 is shown as suspended from the under side of the lure by means of screw 12 which passes through the ferrule 13 attached to the lure.

It will be apparent that the weight 6 may assume any desired shape, and its weight also may vary, it being only necessary that the weight and its position with respect to the lure be such that the lure will automatically return to a substantially upright position when the pull on the lure is released.

From the foregoing description it will be apparent that I have devised a relatively simple and inexpensive lure or artificial bait which when given a series of pulls or jerks will present a very close approximation of a living object in the water by reason of its jumping or bobbing action as well as by reason of the disturbance created on the surface of the water and by the emitted air bubbles rising from the pocket 3 in the forward end of the lure.

While I have described herein the preferred embodiment of the invention, it is to be expressly understood that the device is subject to various changes in details of construction without departing from the spirit of the invention, and it is my purpose to include all such changes within the scope of the appended claims.

What I claim as new and desire to secure by Letters Patent is:

1. An artificial bait including a body portion having a concaved forward end, a line attaching means secured to said end of the body portion, and a weight secured to the opposite end thereof.

2. An artificial bait including a body portion having a concaved forward end, hooks suspended from said body portion, a weight secured to the rear end of the body portion, and a line attaching means secured in the concaved forward end of the body portion.

3. An artificial bait including a body portion having a forwardly and upwardly inclined head portion provided with a concaved portion, a line attaching means secured to the forward end of the body portion, and a weight secured to the rear end of the body portion.

SAM F. DAVENPORT.